United States Patent
Broga et al.

(10) Patent No.: US 9,280,184 B2
(45) Date of Patent: Mar. 8, 2016

(54) DEVICE AND METHOD OF ADJUSTING ELECTROMAGNETIC RADIATION TRANSMITTED BY AN OPTICAL ELEMENT

(75) Inventors: Antanas Matthew Broga, Cambridge (CA); Bergen Albert Fletcher, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 187 days.

(21) Appl. No.: 13/157,442

(22) Filed: Jun. 10, 2011

(65) Prior Publication Data

US 2012/0313908 A1    Dec. 13, 2012

(51) Int. Cl.

| | |
|---|---|
| G01J 3/50 | (2006.01) |
| G01J 3/46 | (2006.01) |
| G06F 1/16 | (2006.01) |
| H04M 1/22 | (2006.01) |
| H04N 5/238 | (2006.01) |
| H04N 5/232 | (2006.01) |
| G01J 1/42 | (2006.01) |
| G01J 1/04 | (2006.01) |

(Continued)

(52) U.S. Cl.
CPC ............ G06F 1/1684 (2013.01); G01J 1/0488 (2013.01); G01J 1/4204 (2013.01); G06F 1/1686 (2013.01); G09G 5/10 (2013.01); H04M 1/22 (2013.01); H04N 5/238 (2013.01); H04N 5/23293 (2013.01); G09G 5/02 (2013.01); G09G 2320/0626 (2013.01); G09G 2320/0666 (2013.01); G09G 2360/144 (2013.01); H04M 2250/12 (2013.01); H04M 2250/52 (2013.01)

(58) Field of Classification Search
CPC .. G06F 1/1684; G09G 5/10; G09G 2360/144; G09G 5/02; G09G 2320/0626; G09G 2320/0666; G01J 1/0488; G01J 1/4204; H04N 5/23293; H04N 5/238; H04M 1/22; H04M 2250/52; H04M 2250/12
USPC .......... 250/208.1, 226; 345/88, 207; 356/411, 356/402; 349/106

See application file for complete search history.

(56) References Cited

U.S. PATENT DOCUMENTS

| | | |
|---|---|---|
| 6,989,859 B2 | 1/2006 | Parulski |
| 7,323,676 B2 | 1/2008 | Duijve |
| 7,446,303 B2 | 11/2008 | Maniam et al. |

(Continued)

FOREIGN PATENT DOCUMENTS

| | | |
|---|---|---|
| EP | 2249136 A2 | 11/2010 |
| GB | 2410827 A | 8/2005 |
| WO | 2009016600 A2 | 2/2009 |

OTHER PUBLICATIONS

Extended European Search Report for corresponding EP 11169422.0 dated Dec. 16, 2011.

(Continued)

*Primary Examiner* — Lun-Yi Lao
*Assistant Examiner* — Ibrahim Khan
(74) *Attorney, Agent, or Firm* — Ridout & Maybee LLP

(57) ABSTRACT

A method of adjusting electromagnetic radiation transmitted by an optical element is described. The method includes sensing the electromagnetic radiation transmitted by the optical element to produce sensed electromagnetic radiation information, and adjusting the sensed electromagnetic radiation information to produce adjusted electromagnetic radiation information based on the a spectral transmission of the optical element.

25 Claims, 6 Drawing Sheets

(51) Int. Cl.
*G09G 5/10* (2006.01)
*G09G 5/02* (2006.01)

(56) References Cited

U.S. PATENT DOCUMENTS

| | | | |
|---|---|---|---|
| 7,864,233 B2* | 1/2011 | Kwon et al. | 348/272 |
| 2005/0146791 A1 | 7/2005 | Bechtel et al. | |
| 2008/0084496 A1 | 4/2008 | Vasilescu et al. | |
| 2008/0170403 A1 | 7/2008 | Gurevich | |
| 2008/0191298 A1* | 8/2008 | Lin et al. | 257/432 |
| 2009/0091652 A1* | 4/2009 | Wernersson | 348/371 |
| 2010/0127159 A1 | 5/2010 | Watanabe | |
| 2010/0225628 A1* | 9/2010 | Souchkov et al. | 345/207 |
| 2010/0282953 A1* | 11/2010 | Tam | 250/226 |
| 2012/0025080 A1* | 2/2012 | Liu et al. | 250/332 |

OTHER PUBLICATIONS

Canadian Examiner's Report, Application No. 2,779,012, Dated Jul. 14, 2014.

* cited by examiner

DEVICE AND METHOD OF ADJUSTING ELECTROMAGNETIC RADIATION TRANSMITTED BY AN OPTICAL ELEMENT

FIELD OF TECHNOLOGY

The present disclosure relates to electronic devices, including mobile devices having ambient light sensors.

BACKGROUND

Electronic devices, including handheld electronic communication devices, have gained widespread use and may provide a variety of functions including, for example, telephonic, electronic text messaging, personal information manager (PIM) application functions, mobile web browsing, and audio and video playback, among other things. In addition to traditional user input, these devices often include components for sensing the device's environment such as proximity sensors, accelerometers and light sensors.

Consumer appeal and functionality are important considerations when designing these devices. Maintaining functionality while using less obtrusive components is generally desirable for such devices.

BRIEF DESCRIPTION OF THE DRAWINGS

Embodiments of the present disclosure will now be described, by way of example only, with reference to the attached figures, wherein.

DETAILED DESCRIPTION

Figure 1:
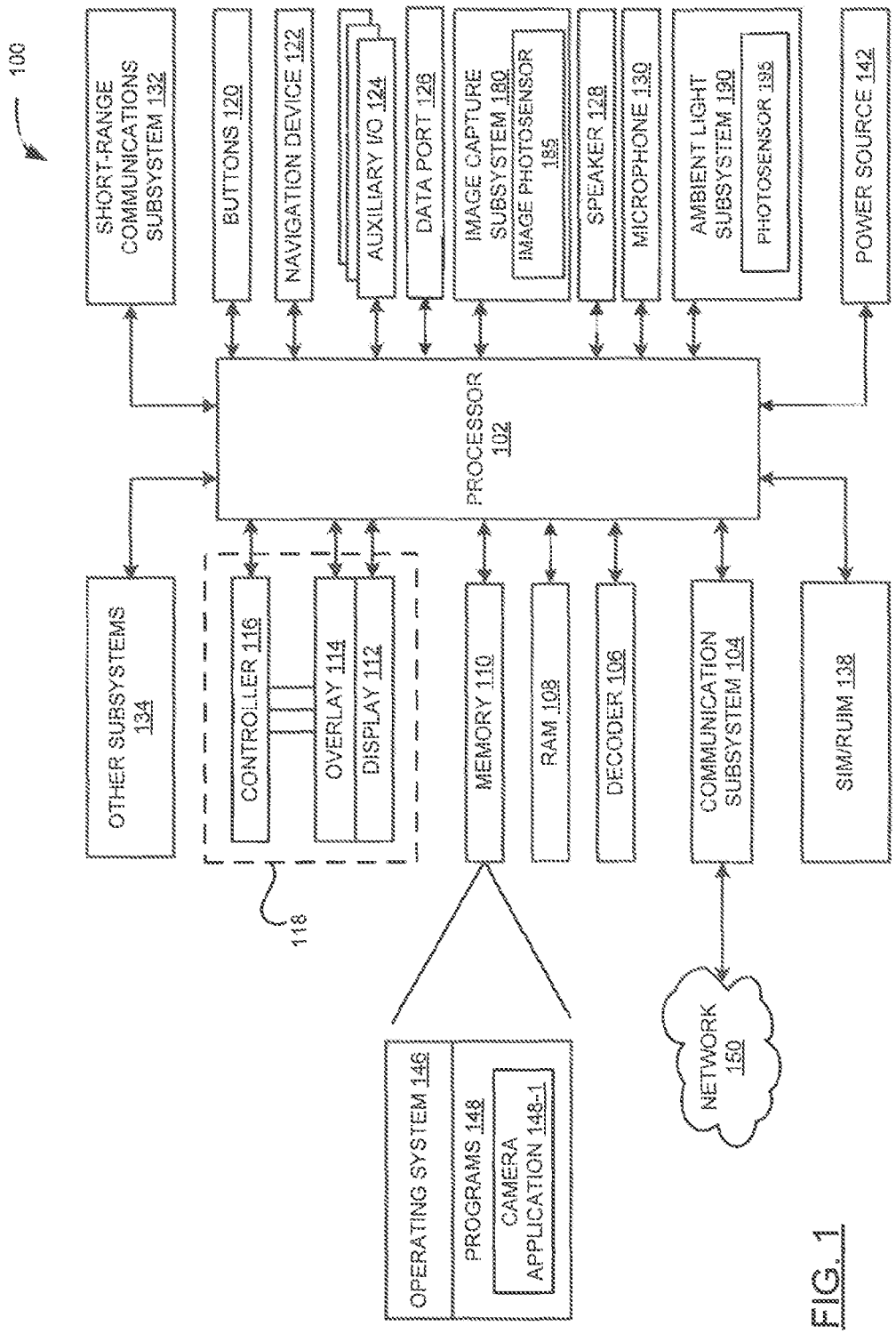
FIG. 1 is a simplified block diagram of components including internal components of a mobile device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Photosensors are electrical components for sensing electromagnetic radiation (EMR), and are commonly configured to convert EMR incident on the photosensor into electrical signals. In mobile devices, photosensors are commonly used to detect ambient light conditions or to capture images.

Ambient light information may be used to adjust display outputs or camera behaviour. For example, if a photosensor senses dim ambient light conditions, the mobile device may be configured to lower the brightness of a display screen to provide appropriate contrast for readability and visual comfort, and to lower battery consumption.

A photosensor may also be used to detect the colour temperature of incident light. For example, based on the detector colour temperature, the mobile device may be configured to adjust the whitebalance or other characteristics of the display output to compensate for the colour temperature of the ambient light. In another example, the mobile device may adjust the intensity or colour of the camera's flash to complement or otherwise compensate for ambient light conditions.

Image photosensors may be used to capture images or video, and may be used by various mobile device applications including but not limited to camera applications, video capture applications, multimedia messaging service applications, and video chat/phone applications.

According to one example of the present disclosure is a method of adjusting electromagnetic radiation transmitted by an optical element. The method includes sensing the electromagnetic, radiation transmitted by the optical element to produce sensed electromagnetic radiation information, and adjusting the sensed electromagnetic radiation information to produce adjusted electromagnetic radiation information based on a spectral transmission of the optical element.

According to another example is a mobile device having a housing including an optical element having a transmission spectrum; a photosensor mounted inside the housing and positioned for sensing electromagnetic radiation passing through the optical element and a processor. The processor is configured to receive sensed electromagnetic radiation information from the photosensor and output adjusted electromagnetic radiation information based on the sensed electromagnetic radiation information and the transmission spectrum of the optical element.

Reference is made to FIG. 1, which illustrates in block diagram form, a mobile device 100 to which example embodiments described in the present disclosure can be applied. The mobile device 100 includes multiple components, such as a processor 102 that controls the overall operation of the mobile device 100. Communication functions, including data and voice communications, are performed through a communication subsystem 104. Data received by the mobile device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the mobile device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 113, one or more keys or buttons 120, a navigation device 122, one or more auxiliary input/output (I/O) subsystems 124, a data port 126, an image capture subsystem 180, a speaker 128, a microphone 130, short-range communications subsystem 132, an ambient light subsystem 190, and other device subsystems 134. It will be appreciated that the electronic controller 116 of the touch-sensitive display 118 need not be physically integrated with the touch-sensitive overlay 114 and display 112. User-interaction with a graphical user interface (GUI) is performed through the touch-sensitive overlay 114. The GUI displays user interface screens on the touch-sensitive display 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a mobile device, is displayed on the touch-sensitive display 118 via the processor 102.

The auxiliary I/O subsystems 124 could include other input devices such as one or more control keys, a keyboard or keypad, navigational tool (input device), or both. The navigational tool may be a depressible (or clickable) joystick such as a depressible optical joystick, a depressible trackball, a depressible scroll wheel, or a depressible touch-sensitive trackpad or touchpad. The other input devices could be included in addition to, or instead of, the touch-sensitive display 118, depending on the embodiment.

To identify a subscriber for network access, the mobile device 100 uses a Subscriber Identity Module or a Removable User Identity Module (SIM/RUIM) card 138 for communication with a network, such as the wireless network 150. Alternatively, user identification information may be programmed into memory 110.

The mobile device 100 includes an operating system 146 and software programs or components 148 that are executed by the processor 102 and are typically stored in a persistent, updatable store such as the memory 110. Additional applications or programs may be loaded onto the mobile device 180 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the mobile device 100 is similar. The speaker 128 outputs audible information converted from electrical signals, and the microphone 130 converts audible information into electrical signals for processing.

In some example embodiments, the mobile device 100 includes an image capture subsystem 180. The image capture subsystem 180 includes a photosensor such as an image sensor 185 adapted to capture photo or video image data. In some example embodiments, the image capture subsystem 180 may include one or more modules or sub-processors for processing image data received through the image photosensor 185.

In an example embodiment, the operation and functionality of the image capture subsystem 180 and its associated image photosensor 185 is controlled by processor 102 operating under instructions from a camera application 148-1 that is included among software programs 148. In example embodiments, the camera application 148-1 enables the handheld electronic device 100 to operate in an image capturing mode or camera mode in which image data received through the image photosensor 185 is displayed on display screen 118 and, upon occurrence of a image capture trigger, an image file derived from the received image data is created and stored as an image file in persistent memory such as memory 110 or a memory card inserted into a memory card interface of the mobile device 100.

By way of example, the mobile device 100 may be configured to enter a camera mode when a predetermined user input is received such as user selection of a physical camera mode enabling button 120 or a predetermined soft button or icon is selected on display screen 118. Once in camera mode, real time-image data as received through the image photosensor 185 is continually displayed on the display screen 118 so that the user can preview or observe in real-time an image that represents the image data being received by image sensor 204. Upon occurrence of an image capture trigger, the image data received through the image photosensor 185 at the time that the image capture trigger occurs is captured, processed and stored as an image file on the mobile device 100. The image data stored in the image file may be an encoded, compressed or otherwise processed version of the image data received by the image photosensor 185. In various examples, the stored image file may be, among other things, a TIF, RC, PNG or GIF file. The image data may also be stored in a raw image format to minimize processing and to preserve image fidelity. The image capture trigger could for example include a predetermined user input—for example activation of navigation device 122 or pressing of a predetermined button 120, or user selection of a predetermined soft button or icon on display screen 118. In some cases the image capture trigger could include a predetermined user input followed by a predetermined delay.

In some example embodiments, the mobile device 100 includes an ambient light subsystem 190 having a photosensor 195. The ambient light photosensor 195 detects incident EMR and generates and outputs an electrical signal representative of the detected EMR. Changes in the intensity of the EMR incident on the photosensor 195 produces corresponding changes in the electrical signal output of the photosensor 195. The ambient light subsystem 190 may include one or more modules or controllers for processing EMR data received through the photosensor 195.

Upon detecting a predetermined ambient light condition, the processor 102 may be configured to perform any number of operations. In some examples, if the photosensor 195 detects low light conditions, the processor 102 may enable button backlighting, or may adjust the brightness of the display screen 118 to reduce power consumption of the display and to provide appropriate contrast for readability and visual comfort.

In some examples, the processor 102 may adjust the white-balance of the display screen 118 based on the colour temperature of the ambient light detected by the photosensor 195. In some examples, the processor 102 may adjust the intensity or colour temperature of the camera flash based on the colour temperature of the ambient light detected by the photosensor 195.

For the purposes of the present disclosure, the term photosensor includes image photosensors 185 adapted for use in a camera or image capture device, as well as EMR photosensors 195 adapted for detecting ambient light information such as illuminance or colour temperature. Examples of photosensors include but are not limited to charge-coupled devices (CCD), complementary metal oxide semiconductor (CMOS)

sensors, photodiodes, photoresistors or any other semiconductor device or other component capable of sensing light or image information.

In some example embodiments, the photosensor (185, 195) includes multiple photosensing elements, with different photosensing elements being adapted to sense EMR having wavelengths falling within different ranges of the electromagnetic spectrum. In some example embodiments, a photosensor may include separate photosensing elements adapted to capture red, green, blue and/or infrared incident EMR.

In some example embodiments, the photosensor (185, 195) includes multiple instances of each type of photosensing element. For example, image photosensors (185) often include arrays of pixels having red, green and blue photosensing elements.

Figure 2:
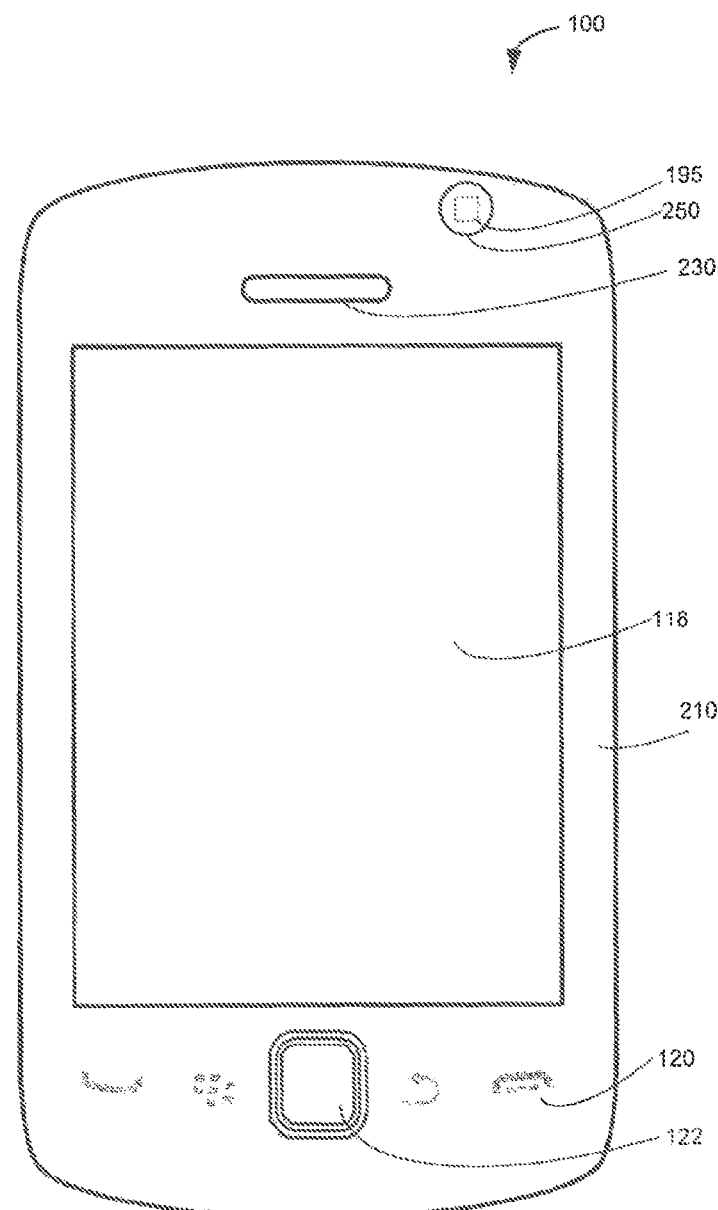
FIG. 2 is a front elevation view of an example embodiment of a mobile device.

Referring to FIG. 2, a front elevation view of an example mobile device 100 is shown. The mobile device 100 includes a housing 210 which forms the external structure of the mobile device 100. The housing 210 may be constructed from one or more members, and houses the internal components of the mobile device 100 such as the processor 102 and other components illustrated in FIG. 1. In some examples, the housing also has one or more openings or sockets for mounting external components such as the display screen 118, keys 120, a navigation device 122, and a sound port 230.

The mobile device includes an optical element 250 through which EMR can pass while providing a degree of protection from external objects. The optical element 250 may be made of any light-transmissive material including but not limited to glass, plastic, or any other material suitable for use in a mobile device 100. In some example embodiments, the optical element 250 may be a separate component or material from the other members of the housing 210. In some example embodiments, the optical element 250 may be the same material or may be integrated with a portion of the housing 210. The optical element may be a window, a film or layer of material, a mesh, a lens, a fiber optic plate, or any other material suitable for transmitting EMR.

The optical element is translucent and has a transmissive spectrum which identifies which wavelengths of EMR can be transmitted by the optical element. It should be understood that translucent refers to an optical element that allows EMR to pass (is not opaque) and but is not perfectly transparent. In some example embodiments, the optical element is a filter which filters portions of the EMR spectrum. In some example embodiments, the optical element is a colour filter which filters portions of the EMR spectrum associated with a colour. In some example embodiments, the optical element may be polarized or may have a mirrored surface which may polarize or refect portions of the EMR spectrum.

The optical element 250 may be coloured to complement or otherwise integrate with the visual exterior design of the mobile device 100. The optical element may be provided by tinting the optical element material, or by applying a coloured, light-transmissive film or layer to a surface of the optical element material. Behind the optical element 250 is a photosensor 195 positioned to detect EMR passing through the optical element from outside the device.

In many instances, the transmissive spectrum of the optical element 250 is not flat across the electromagnetic spectrum. This uneven transmissive spectrum may cause distortion or filtering of electromagnetic radiation passing through the optical element 250 when determining ambient light information or when capturing images.

Figure 3:
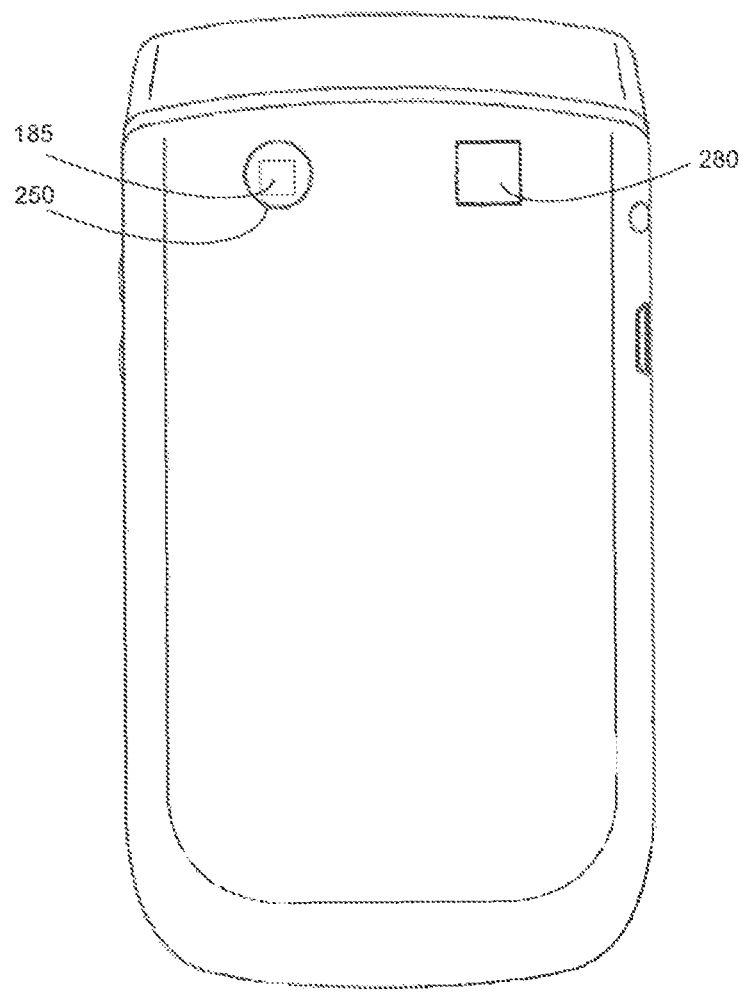
FIG. 3 is a rear elevation view of an example embodiment of a mobile device.
Figure 4:
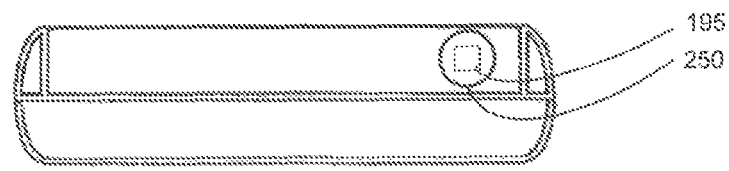
FIG. 4 is a top elevation view of an example embodiment of a mobile.

While the optical element 250 is illustrated in FIG. 2 on the upper front portion of the mobile device 100, in other examples, the optical element and the underlying photosensor 185, 195 may be positioned anywhere on the housing 210 and on any face of the housing 210. For example, the optical element 250 may be positioned on the rear face of the housing as illustrated in FIG. 3, or on the top face of the housing as illustrated in FIG. 4. In some examples, the device 100 may have a flash or illuminator 280 which may be used in conjunction with the image capture subsystem 180 and the ambient light subsystem 190.

In some example embodiments, the device 100 may have multiple photosensors, such as multiple image photosensors, multiple EMR photosensors, or combinations of the two. In these examples, each photosensor may be positioned behind different optical elements, or multiple photosensors may be positioned behind the same optical element.

Figure 5:
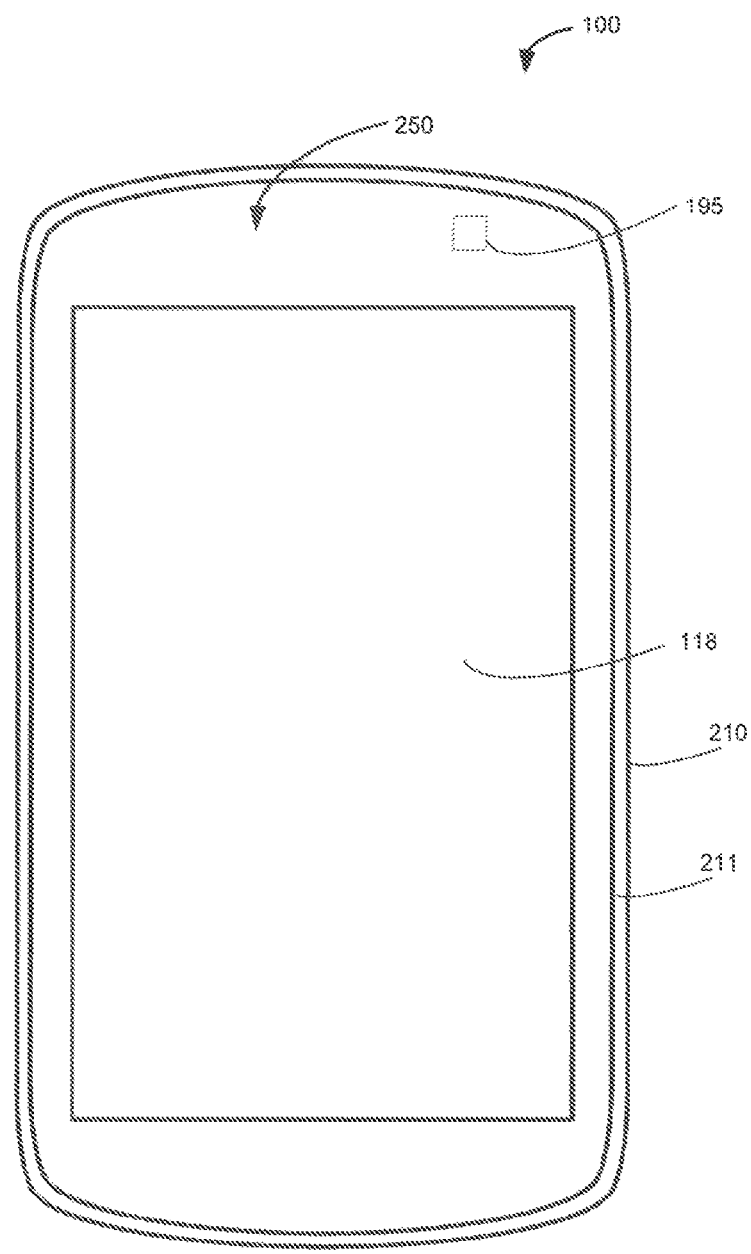
FIG. 5 is a front elevation view of another example embodiment of a mobile device.

In some example embodiments, the optical element 250 is a portion of a light-transmissive material. For example, in FIG. 5, the front face of the device 100 is primarily covered by a pane of transmissive material 211. The portion of the pane 211 covering the display 118 may be clear and may have a touch-sensitive overlay 114 (FIG. 1). The surrounding portion of the pane 211 not covering the display 118 may be coloured or mirrored to form the optical element 250. The photosensor 195 may be positioned anywhere behind the coloured or mirrored portion of the pane.

Figure 6:
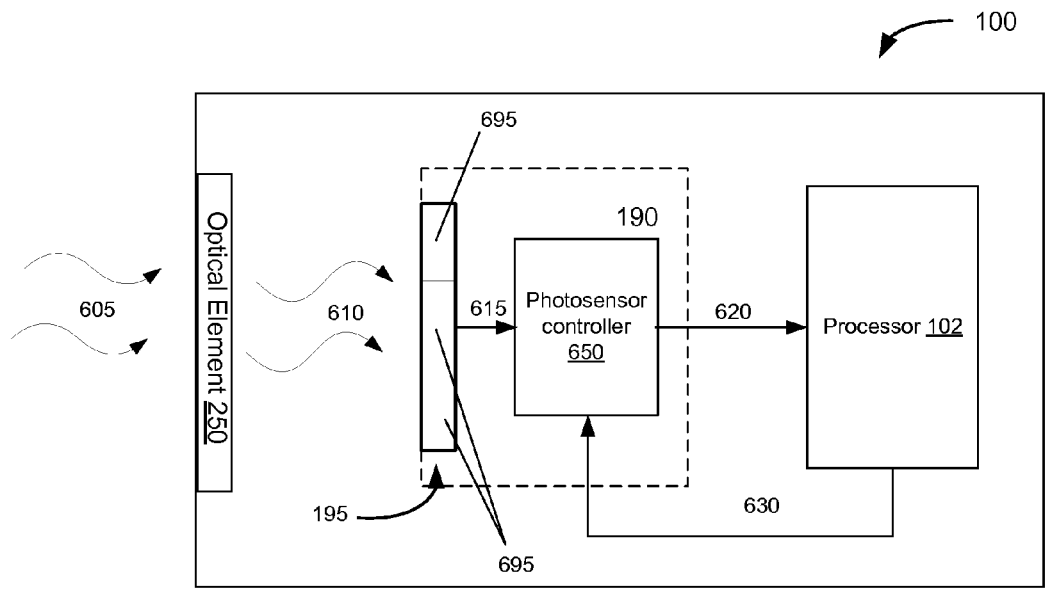
FIGS. 6 and 7 are data flow diagrams illustrating a subset of the components included in an example embodiment of a mobile device.

FIG. 6 shows a data flow diagram illustrating a subset of the components included in an example mobile device. Electromagnetic radiation 605 is incident on the optical element 250 of the device 100. The optical element 250 may absorb or reflect at least a portion of the incident electromagnetic radiation 605 based on a number of factors including the shape and the transmissive spectrum of the optical element 250. As a result, the electromagnetic radiation transmitted through the optical element 250 is filtered or otherwise represents a subset of the incident electromagnetic radiation 605. The transmitted electromagnetic radiation 610 is incident on the photosensor 195.

The photosensor 195 is part of the ambient light subsystem 190. In some example embodiments, the ambient light subsystem 190 also includes a photosensor controller 650. In some example embodiments, the photosensor controller 650 may include circuitry such as analog-to-digital converters (ADC), amplifiers and other analog circuitry. In some example embodiments, the photosensor controller 650 may include a microcontroller or other logic circuitry for controlling the photosensor 195 and for processing photosensor information. In some example embodiments, the photosensor controller 650 may also include memory, registers, or other components for storing information.

In some example embodiments, the ambient light subsystem 190 may be implemented using separate components for the photosensor 195 and the analog and logic circuitry in the photosensor controller 195. In some example embodiments, the ambient light subsystem 190 may be implemented using electronic components which include both the photosensor 195 and the photosensor controller 650.

In other example embodiments, the ambient light subsystem 190 may not include a photosensor controller 195, and any photosensor control or information processing may be handled by the processor 102.

In some example embodiments, the photosensor 195 includes two or more photosensing elements 695. The photosensing elements 695 are positioned such that the transmitted electromagnetic radiation 610 passing through the optical element 250 is incident on the photosensing elements 695. Based on the wavelength and intensity of the incident transmitted electromagnetic radiation, a photosensing element 695 produces sensed EMR information 615 often in the form of a voltage, a current or a resistance. The voltage, current or resistance value corresponds to an EMR value such as an illuminance or light intensity value.

Photosensing elements may be implemented using any device capable of converting electromagnetic radiation into an electrical signal including but not limited to photodiodes, photoresistors, phototubes, charge-coupled devices, phototransistors, and photovoltaic cells.

In some example embodiments, the photosensing elements 695 are adapted to sense a specific range of electromagnetic radiation. In some example embodiments, the range of electromagnetic radiation detectable by a photosensing element 695 may be defined by the size and doping of semiconductors in the photosensing element 696, in other example embodiments, the photosensing element 695 may be adapted to detect a specific range of electromagnetic radiation by filtering incident electromagnetic radiation such that the sensing components can only detect electromagnetic radiation within a specific range of the electromagnetic spectrum. In some example embodiments, the photosensing element 695 may produce an output proportional to the intensity of the incident electromagnetic radiation falling within the element's detection range.

In some example embodiments, each photosensing element 695 in the photosensor 195 is adapted to have different detection ranges in the electromagnetic spectrum. The detection ranges between photosensing elements 695 may or may not overlap. For example, a photosensor 195 may have two photosensing elements 695, one adapted to detect light having wavelengths between violet and green, and the other adapted to detect light having wavelengths between yellow and red.

In some example embodiments, the ambient light subsystem 190 may be implemented using separate components for the photosensor 650 and the analog and logic circuitry in the photosensor controller 650. In some example embodiments, the ambient light subsystem 190 may be implemented using electronic components which include both the photosensor 195 and the photosensor controller 650.

In other example embodiments, the ambient light subsystem 190 may not include a photosensor controller 650, and any photosensor control or information processing may be handled by the processor 102.

The sensed EMR information 615 from each photosensing element 695 is processed by the photosensing controller 650 to determine adjusted electromagnetic radiation information 620 which is sent to the processor 102. The adjusted electromagnetic radiation information 620 represents information about the electromagnetic radiation incident on the optical element 250 before it passes through and is filtered by the optical element 250. In some example embodiments, the photosensing controller 650 converts the sensed EMR information 615 from analog to digital using an ADC, and may amplify or attenuate some of sensed EMR information 615 from the photosensor 195. In some example embodiments, the photosensing controller 650 converts the sensed EMR information, which may be in the form of a voltage, current or resistance value, into adjusted EMR information 620 such as an intensity value.

In some example embodiments, the photosensing controller 650 may use the sensed EMR information 615 to determine adjusted EMR information 620 such as luminous intensity, illuminance, wavelengths or colour temperature. This adjusted EMR information 620 may include separate pieces of adjusted EMR information from each photosensing element 695, or it may include general adjusted EMR information determined from a combination of the sensed EMR information 615 from different photosensing elements 695. In some examples, the photosensing controller 650 may scale the sensed EMR information 615 from each photosensing element 695 differently based on a luminosity or V-lambda function used to describe the human eye's varying sensitivity to different wavelengths of light. The adjusted EMR information 620 may include any data that can describe electromagnetic radiation and is not limited to the specific examples described herein.

In some example embodiments, the controller 650 may be configured to adjust the sensed EMR information 615 using adjustment factors 630 to compensate for the filtering or distortion of the incident electromagnetic radiation 605. That is, it may apply weighting factors to the sensed EMR information 615 for individual photosensing elements 695 to compensate or offset the filtering caused by the optical element 250. The weighted sensed EMR information 615 may then be used by the photosensor controller 650 when applying the V-lambda function to determine the adjusted EMR information 620. The adjustment factors 630 may include these weighting factors. The weighting factors are predetermined based on the transmission spectrum of the optical element 250. The adjustment factors 630 may also include an overall gain factor to be applied to the adjusted EMR information 620 to offset any magnitude loss in the calculation of illuminance resulting from the filtering of the weighting factors. In some examples, the adjustment factors 630 may be combined with the scaling of the V-lambda function. In the example embodiment illustrated in FIG. 6, these adjustment factors 630 may be sent to the photosensing controller 650 from the processor 102. In some example embodiments, the adjustment factors 630 may be stored in memory or registers in the ambient light subsystem 190.

In other example embodiments, the adjustment factors 630 may be read by the ambient light subsystem 190 from memory 110, registers, or other data storage locations elsewhere on the device 100. In yet other example embodiments, the adjustment factors 630 may be hardwired, programmed or otherwise stored in any electronic component in the ambient light subsystem 190.

In other example embodiments, the processor 102 may not send adjustment factors 630 to the photosensing controller 650. Instead, the processor 102 may itself use the adjustment factors to modify the adjusted EMR information 620 to compensate for the filtering or distortion caused by the optical element 250.

In some example embodiments, the ambient light subsystem may not have a controller 650 for adjusting the sensed EMR information or for determining adjusted EMR information. In these example embodiments, the processor 102 receives the digitized sensed EMR data and the processor 102 applies the adjustment factors 630 and determines the adjusted EMR information using for example the V-lambda function to calculate illuminance.

In the above example embodiments, elements of the mobile device 100 have been characterized as comprising parts of the photosensor 195, photosensor controller 650, ambient light subsystem 190 and processor 102; however, it should be understood that the elements may be physically or logically grouped in any manner without affecting the functionality or interaction between the elements.

Figure 7:
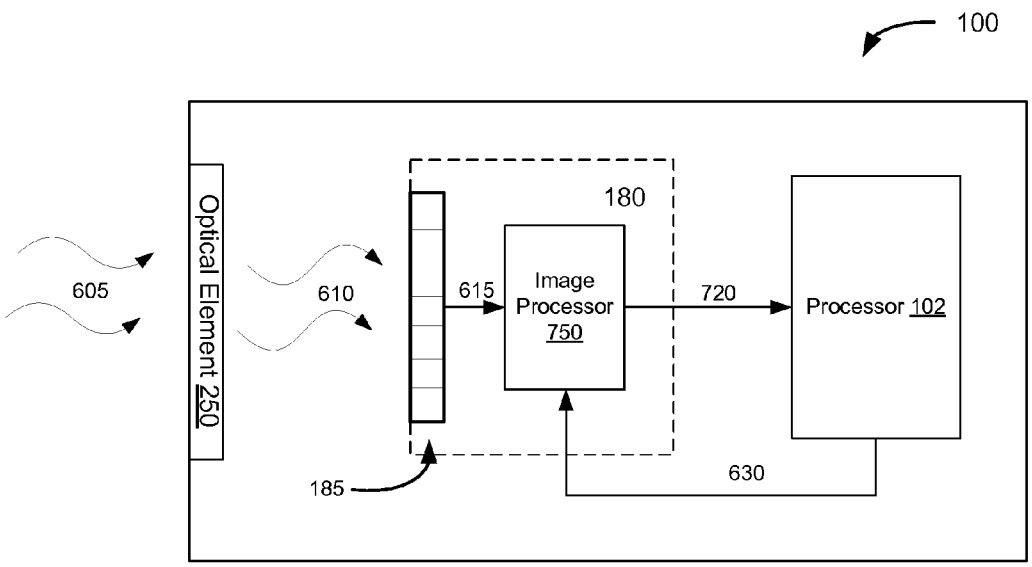

The above examples apply similarly to an image photosensor 185 and an image capture subsystem 180 as illustrated by the example in FIG. 7. FIG. 7 shows another data flow diagram illustrating a subset of the components included in an example mobile device. In this example, the transmitted electromagnetic radiation 610 is incident on an image photosensor 185. The image photosensor 185 captures sensed EMR information 615 based on the filtered electromagnetic radiation 610 which is processed by the image processor 750 to form image data 720.

In some example embodiments, the image processor 750 may adjust the sensed EMR information 615 using adjustment factors 630 to compensate for the filtering or distortion of the incident electromagnetic radiation 605. In some examples, the sensed EMR information 615 includes distorted image data which is based on an image detected from the filtered EMR. Using the adjustment factors may include adjusting the colours of the distorted image data to create image data 720.

The adjustment factors 630 may be sent to or stored in the image capture subsystem 180, and may be applied by the image capture subsystem 180 or by the processor 102 similarly as described with respect to the ambient light subsystem 190 examples.

Figure 8:
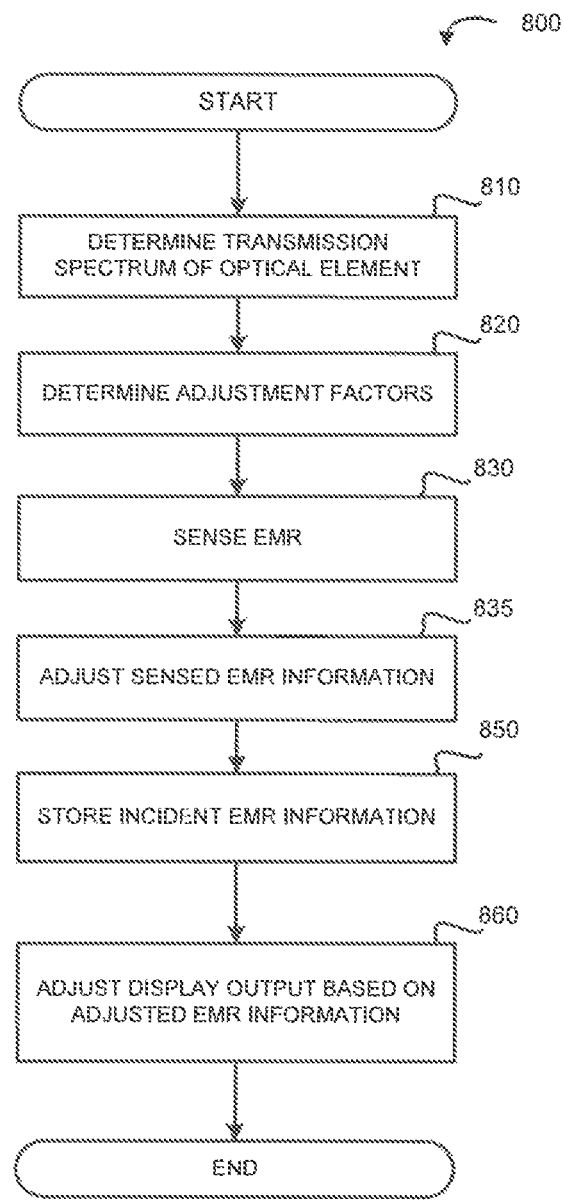
FIG. 8 shows, in flowchart form, an example method of electromagnetic radiation transmitted by an optical element.

Referring to FIG. 8, a method 800 of determining incident electromagnetic radiation information is illustrated. At block 810, the transmission spectrum of the optical element 250 is determined. In some examples, this may be determined by shining electromagnetic radiation having a known spectral distribution at the optical element 250 and detecting the electromagnetic radiation that passes through the optical element. In some examples, the transmission spectrum may be determined in a single calibration test by shining full-spectrum electromagnetic radiation containing all wavelengths of EMR in the range detectable by the device's photosensors (185, 195). In other examples, the transmission spectrum may be determined by combining the results of multiple calibration tests with different tests having different ranges of electromagnetic radiation to shine on the optical element 250.

In some examples, the transmission spectrum of the optical element 250 may be determined during the design phase of a mobile device 100. In other examples, the transmission spectrum of the optical element 250 may be determined during provisioning of the device thereby allowing devices with the same internal components to be calibrated for different housings with differently optical elements 250. In some examples, the device 100 may be configured to include a self-calibration option by instructing a user to shine different types of light such as fluorescent, incandescent, light-emitting diode (LED), or sunlight on the optical element. Based on the average electromagnetic spectra of these light sources, and the EMR information detected by the photosensor 195, the device 100 may determine the transmission spectrum of the optical element 250.

At block 820, adjustment factors for compensating for the transmission spectrum of the optical element 250 are determined. In some example embodiments, the adjustment factors 630 may include factors for controlling the gain, amplification or attenuation applied to the sensed EMR information 615 from each photosensing element 895 in the photosensor 185, 195. In some example embodiments, the adjustment factors may include modifications to a luminosity function or colour temperature determination.

At block 830, the sensed electromagnetic radiation (sensed EMR) information is received from the photosensor 185, 195. This information may be received by a photosensor controller 650, an image processor 750 or a processor 102. The sensed EMR information may include any information about the electromagnetic radiation that has passed through and has been filtered by the optical element 250, and is detected on the photosensor 185, 195. In some examples, the sensed EMR information may include but is not limited to illuminance, luminous flux, or spectral power distribution information for each photosensing element 695 in the photosensor. In some examples, the sensed EMR information may include pixel colour and intensity information detected by an image photosensor 185.

At block 835, the sensed EMR information is adjusted using the adjustment factors determined at block 820. In some example embodiments, the adjustment factors are used to weight the sensed EMR information 615 to compensate for the filtering of electromagnetic radiation by the optical element 250. In some embodiments, the adjustment factors may weigh sensed EMR information from different photosensing elements differently to compensate for the non-uniform filtering of different wavelengths of electromagnetic radiation caused by the optical element 250. In some embodiments, the adjustment factors may apply an overall gain factor to the sensed EMR information from all the photosensing elements to compensate for an overall dampening caused by the optical element 250.

In some example embodiments, adjusting 840 the sensed EMR information may include determining an illuminance or colour temperature representative of the illuminance or colour temperature of the EMR incident on the optical element 250 before it passes through the optical element. In other examples, adjusting 840 the sensed EMR information may include determining image data by adjusting image information sensed by an image sensor to compensate for the transmission spectrum of the optical element 250.

Illuminance is a measure of the intensity of incident light on a surface and weights different wavelengths differently to correlate with human brightness perception. For discrete electromagnetic spectra, an estimate of illuminance is proportional to the dot product of a luminosity function and the spectral power distribution of the electromagnetic radiation. The luminosity function provides an approximation of the human eye's visual sensitivity to different wavelengths of light. In some examples, the processor 102 or ambient light subsystem 190 may be configured to calculate illuminance using a standard luminosity (V-lambda) function such as the CIE (Commission Internationale de l'Éclairage) standard photopic luminosity function, or the CIE standard scotopic luminosity function. The spectral power distribution may be estimated from the sensed EMR information detected by the photosensing elements.

In some example embodiments, the illuminance may be determined by having different photosensing elements 659 adapted to sense different spectral ranges, and differentially scaling the adjusted sensed EMR information from each photosensing element 695 to estimate the luminosity function.

For example, if a photosensor 195 having separate photosensing elements 695 adapted for detecting EMR in the red, green and blue spectral ranges is positioned behind an optical element 250 having a reddish transmission spectrum (i.e. the optical element allows most red wavelengths to pass, and filters some green and blue wavelengths), at block 835, the sensed EMR information received from the photosensing elements may be adjusted by decreasing the weight of the information from the red photosensing element, and increasing the weight of the information from the blue and green photosensing elements to compensate for the transmission spectrum. The information from the red and green photosensing elements would be weighted more strongly than the adjusted sensed EMR information from the blue photosensing element because based on the standard photopic luminosity function, the human eye is more sensitive to red and green light than to blue light.

In some example embodiments, increasing the number of photosensing elements and adapting each photosensing element to detect a smaller range of the electromagnetic spectrum may increase the accuracy of the illuminance determination, by allowing for a more granular reconstruction of the luminosity function and a more granular adjustment for the transmission spectrum of the optical element 250.

In some example embodiments, including photosensing elements adapted to detect infrared and/or ultraviolet spectral ranges may provide additional information regarding the ambient light conditions not detectable by the human eye.

In some example embodiments, adjusting 835 the sensed EMR information may include determining an illuminance or colour temperature representative of the illuminance or colour temperature of the EMR incident on the optical element 250 before it passes through the optical element. In other examples, adjusting 840 the sensed EMR information may include determining image data by adjusting image information sensed by an image sensor to compensate for the transmission spectrum of the optical element 250.

Not withstanding the examples above, it should be understood that in some embodiments the events in block 835 may be reversed or combined. For example, the adjustments to the sensed EMR information to compensate for the filtering by the optical element 250 and the weighting of the EMR information based on the luminosity function may be performed in any order, or may be performed by combining the optical element adjustment and luminosity function weighting factors.

In addition to illuminance, examples of adjusted EMR information determined at block 835 may include colour temperature or image data. Colour temperatures of incident light and image pixel information are both dependent on the colour of the light. Therefore, when determining colour temperature or image data, compensating for the transmissive spectrum of the optical element 250 may be done by differentially weighting different photosensing element information in a similar manner as described above.

At block 850, the adjusted EMR information determined in block 835 is outputted and may be stored in the device's memory 110, RAM 108, or at any other location on the device 100.

In some example embodiments, the processor 102 may be configured to adjust the output of the display 118 based on the adjusted EMR information as shown in block 860. In some examples, if the adjusted EMR information includes a high illuminance value, the processor 102 may be configured to increase the brightness of the display 118, and likewise, if the illuminance value is low, the processor 102 may be configured to decrease the brightness of the display 118. In other examples, if the adjusted EMR information includes a colour temperature, the processor 102 may be configured to adjust the contrast, tint, white balance or other characteristics of the display output based on the colour temperature.

In some examples, the processor 102 may be configured to adjust the colour or intensity of the flash output based on the colour temperature. The processor 102 may also be configured to adjust other camera settings such as ISO settings or shutter speeds based on the adjusted EMR information.

In some example embodiments, the adjusted EMR information may be used by the processor 102 to determine the type of ambient light (e.g. fluorescent light, LED light, incandescent lights, sun light, etc.) in which the device 100 is operating. The device 100 may have a number of preset profiles containing settings for screen brightness, phone volume, etc. which can be automatically set depending on the type of ambient light.

While the embodiments described herein are directed to particular implementations of the mobile device, it will be understood that modifications and variations may occur to those skilled in the art having read the present disclosure. All such modifications and variations are believed to be within the sphere and scope of the present disclosure.

What is claimed is:

1. A method, implemented by a mobile device, of adjusting electromagnetic radiation, the method comprising:
   receiving incident electromagnetic radiation at a color filter integrated with an exterior surface of a housing of the mobile device, the color filter providing non-uniform filtering of different wavelengths of electromagnetic radiation to produce an uneven transmission spectrum that is uneven across the electromagnetic spectrum;
   transmitting, through the color filter, filtered electromagnetic radiation;
   sensing the filtered electromagnetic radiation, the electromagnetic radiation being sensed on a photosensor having two or more adjusted photosensing elements, each adjusted photosensing element having a respective detection range for a respective different electromagnetic wavelength range, to produce sensed electromagnetic radiation information; and
   adjusting the sensed electromagnetic radiation information to compensate for the uneven transmission spectrum of the color filter and to produce adjusted electromagnetic radiation information that is representative of the incident electromagnetic radiation instead of the filtered electromagnetic radiation, the adjusting comprising adjusting the sensed electromagnetic radiation information from each adjusted photosensing element independently using one or more weighting factors for each individual adjusted photosensing element, the one or more weighting factors being predetermined based on the uneven transmission spectrum of the color filter.

2. The method of claim 1 wherein adjusting the sensed electromagnetic radiation information comprises determining an illuminance by applying to the sensed electromagnetic information the one or more weighting factors, the one or more weighting factors being based on the uneven transmission spectrum of the color filter and a luminosity or V-lambda function.

3. The method of claim 2 wherein determining the illuminance is based on a first luminosity function for dim ambient light conditions and is based on a second luminosity function for non-dim ambient light conditions.

4. The method of claim 1 further comprising predetermining the uneven transmission spectrum of the color filter before sensing the electromagnetic radiation by applying an electromagnetic radiation having a known spectral distribution to the color filter and measuring the resultant filtered electromagnetic radiation transmitted by the color filter.

5. The method of claim 4 further comprising predetermining the one or more weighting factors for adjusting the sensed electromagnetic information based on the predetermined uneven transmission spectrum of the color filter.

6. The method of claim 4, wherein determining the uneven transmission spectrum of the color filtering comprises outputting one or more prompts instructing application of one or more electromagnetic radiation having known spectral distributions to the color filter.

7. The method of claim 1 further comprising:
   based on the adjusted electromagnetic radiation, determining a preset display profile defining display characteristics, and
   adjusting a display output based on the preset display profile.

8. The method of claim 7 wherein adjusting the display output comprises adjusting the brightness, color, or whitebalance of the display.

9. The method of claim 1 further comprising adjusting a camera setting or flash output based on the adjusted electromagnetic radiation information.

10. The method of claim 1 wherein the photosensor comprises an image sensor, and wherein the sensed electromagnetic radiation information includes sensed image information, and wherein adjusting the sensed electromagnetic radiation information includes determining image data based on the sensed image information and the transmission spectrum of the color filter.

11. The method of claim 1 wherein adjusting the sensed electromagnetic radiation information includes determining a color temperature.

12. A mobile device comprising:
a housing having a color filter integrated with an exterior surface thereof and positioned to receive incident electromagnetic radiation, the color filter providing non-uniform filtering of different wavelengths of electromagnetic radiation to produce an uneven transmission spectrum that is uneven across the electromagnetic spectrum;
a photosensor, having two or more adjusted photosensing elements, mounted inside the housing and positioned for sensing filtered electromagnetic radiation transmitted through the color filter, each adjusted photosensing element having a respective detection range for a respective different electromagnetic wavelength range; and
a processor configured to:
receive sensed electromagnetic radiation information from the photosensor; and
output adjusted electromagnetic radiation information based on the sensed electromagnetic radiation information, the adjusting electromagnetic radiation being generated by adjusting the sensed electromagnetic radiation information from each adjusted photosensing element independently using one or more weighting factors for each individual adjusted photosensing element, the one or more weighting factors being predetermined based on the uneven transmission spectrum of the color filter, the adjusted electromagnetic radiation information being adjusted to compensate for the uneven transmission spectrum of the color filter, the adjusted electromagnetic radiation being representative of the incident electromagnetic radiation instead of the filtered electromagnetic radiation.

13. The mobile device of claim 12 wherein the color filter is translucent.

14. The mobile device of claim 13 wherein the photosensor comprises:
a first photosensing element adapted to detect a blue region of electromagnetic spectrum;
a second photosensing element adapted to detect a red region of electromagnetic spectrum; and
a third photosensing element adapted to detect a green region of electromagnetic spectrum.

15. The mobile device of claim 14 wherein the photosensor further comprises:
a fourth photosensing element adapted to detect an infrared region of electromagnetic spectrum.

16. The mobile device of claim 12 wherein the color filter is a window in the exterior surface of the housing.

17. The mobile device of claim 12 further comprising a memory having stored thereon one or more weighting factors for compensating for the transmission spectrum of the color filter.

18. The mobile device of claim 12 wherein the photosensor comprises an image sensor, and wherein the adjusted electromagnetic radiation information includes adjusted image data.

19. The mobile device of claim 12 wherein the device is configured to adjust the output of the display based on the adjusted electromagnetic radiation information.

20. The mobile device of claim 19 further comprising a memory having stored thereon one or more preset display profiles defining display characteristics, wherein the device is configured to adjust the output of the display by determining one of the one or more preset display profiles and adjusting the output of the display based on the determined preset display profile.

21. The mobile device of claim 20 wherein the device is configured to adjust the output of the display by adjusting the brightness, color or whitebalance of the display.

22. The mobile device of claim 12 further comprising a flash, and wherein the device is configured to adjust the output of the flash based on the adjusted electromagnetic radiation information.

23. The mobile device of claim 12 wherein the device is configured to perform the method of claim 1.

24. The mobile device of claim 12, wherein a color associated with the color filter is in correspondence with a color of the housing.

25. A non-transitory computer-readable medium having computer-executable instructions tangibly encoded thereon, the instructions, when executed by a processor of a mobile device, causing the mobile device to:
receive incident electromagnetic radiation at a color filter integrated with an exterior surface of a housing of the mobile device, the color filter providing non-uniform filtering of different wavelengths of electromagnetic radiation to produce an uneven transmission spectrum that is uneven across the electromagnetic spectrum;
transmit, through the color filter, filtered electromagnetic radiation;
sense the filtered electromagnetic radiation, the electromagnetic radiation being sensed on a photosensor having two or more adjusted photosensing elements, each adjusted photosensing element having a respective detection range for a respective different electromagnetic wavelength range, to produce sensed electromagnetic radiation information; and
adjust the sensed electromagnetic radiation information to compensate for the uneven transmission spectrum of the color filter and to produce adjusted electromagnetic radiation information that is representative of the incident electromagnetic radiation instead of the filtered electromagnetic radiation, the adjusting comprising adjusting the sensed electromagnetic radiation information from each adjusted photosensing element independently using one or more weighting factors for each individual adjusted photosensing element, the one or more weighting factors being predetermined based on the uneven transmission spectrum of the color filter.

* * * * *